(12) United States Patent
Ichinose et al.

(10) Patent No.: US 10,049,821 B2
(45) Date of Patent: Aug. 14, 2018

(54) FILM CAPACITOR AND MANUFACTURING METHOD THEREFOR

(71) Applicant: PANASONIC INTELLECTUAL PROPERTY MANAGEMENT CO., LTD., Osaka (JP)

(72) Inventors: Tsuyoshi Ichinose, Osaka (JP); Hiromasa Matsui, Toyama (JP); Hiroki Takeoka, Nara (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 64 days.

(21) Appl. No.: 15/118,786

(22) PCT Filed: Feb. 6, 2015

(86) PCT No.: PCT/JP2015/000551
§ 371 (c)(1),
(2) Date: Aug. 12, 2016

(87) PCT Pub. No.: WO2015/125436
PCT Pub. Date: Aug. 27, 2015

(65) Prior Publication Data
US 2017/0053744 A1    Feb. 23, 2017

(30) Foreign Application Priority Data

Feb. 19, 2014   (JP) .................................. 2014-029218

(51) Int. Cl.
*H01G 2/10* (2006.01)
*H01G 4/18* (2006.01)
(Continued)

(52) U.S. Cl.
CPC ................. *H01G 4/33* (2013.01); *H01G 2/10* (2013.01); *H01G 4/18* (2013.01); *H01G 4/224* (2013.01);
(Continued)

(58) Field of Classification Search
CPC .......... H01G 4/33; H01G 4/236; H01G 4/232; H01G 4/32; H01G 4/224; H01G 4/18; H01G 2/10
See application file for complete search history.

(56) References Cited

U.S. PATENT DOCUMENTS

2007/0072073 A1    3/2007  Kodama
2013/0108915 A1*   5/2013  Fukuda ................. H01M 2/021
                                                                                429/176

FOREIGN PATENT DOCUMENTS

JP        05-096682 B2     4/1993
JP        2002-043180 A    2/2002
(Continued)

OTHER PUBLICATIONS

International Search Report and Written Report issued in corresponding International Patent Application No. PCT/JP2015/000551, dated May 12, 2015; with partial English translation.

*Primary Examiner* — Eric Thomas
(74) *Attorney, Agent, or Firm* — McDermott Will & Emery LLP

(57) ABSTRACT

A film capacitor according to the present disclosure includes: a film capacitor element; a bus bar connected to the film capacitor element; and an exterior member which covers the film capacitor element and the bus bar; wherein the exterior member is formed of a metal laminate film, the metal laminate film having a first resin layer on a surface facing the film capacitor element, a part of the bus bar is exposed to an outside of the exterior member, and a second resin layer containing an acid-modified resin is formed between the first resin layer and the bus bar at an exposing port of the exterior member through which the part of the bus bar is exposed from the exterior member.

11 Claims, 14 Drawing Sheets

(51) Int. Cl.
*H01G 4/224* (2006.01)
*H01G 4/33* (2006.01)
*H01G 4/32* (2006.01)
*H01G 4/232* (2006.01)
*H01G 4/236* (2006.01)

(52) U.S. Cl.
CPC ............. *H01G 4/232* (2013.01); *H01G 4/236* (2013.01); *H01G 4/32* (2013.01); *Y02T 10/7022* (2013.01)

(56) References Cited

FOREIGN PATENT DOCUMENTS

| | | |
|---|---|---|
| JP | 2005-176487 A | 6/2005 |
| JP | 2005-222788 A | 8/2005 |
| JP | 2006-310834 A | 11/2006 |
| JP | 2007-095465 A | 4/2007 |
| JP | 2007-157615 A | 6/2007 |
| JP | 2009-094122 A | 4/2009 |
| JP | 2010-092631 A | 4/2010 |
| JP | 2013-171738 A | 9/2013 |

\* cited by examiner

FILM CAPACITOR AND MANUFACTURING METHOD THEREFOR

RELATED APPLICATIONS

This application is the U.S. National Phase under 35 U.S.C. § 371 of International Patent Application No. PCT/JP2015/000551, filed on Feb. 6, 2015, which in turn claims the benefit of Japanese Application No. 2014-029218, filed on Feb. 19, 2014, the disclosures of which Applications are incorporated by reference herein.

TECHNICAL FIELD

The present disclosure relates to a film capacitor and a manufacturing method therefor.

BACKGROUND ART

In recent years, film capacitors are used for electric appliances, electronic appliances, and in particular to inverter circuits driven by motors. Film capacitors for use in such inverter circuits have been actively developed for the purposes of reducing sizes, increasing performances, and reducing costs.

The film capacitors for use in inverter circuits are required to support high voltages for use, large currents, or have large capacities. For this reason, film capacitors having an external case in which a plurality of capacitor elements connected in parallel are housed and molded with a mold resin have been developed and used.

On the other hand, for the purpose of reducing the size and weight of film capacitors, film capacitors having capacitor elements and external terminals covered by a metal laminate film instead of using such an external case and a mold resin have also been developed as in, for example, Patent Literature 1.

CITATION LIST

Patent Literature

PTL 1
Japanese Unexamined Patent Application Publication No. 2009-94122

SUMMARY OF THE INVENTION

Technical Problem

As a film capacitor in which a large current flows, a bus bar (external terminal) having a comparatively large thickness is used. The bus bar passes through an exposing port of metal laminate films to be exposed to the outside of the metal laminate films. However, when forming a bus bar having a large thickness so as to cause a large current to flow, it is difficult to bring the metal laminate films into close contact with the bus bar. For this reason, there is a problem that a gap occurs between the metal laminate films and the bus bar.

In view of this, the present disclosure has an object to provide a film capacitor capable of reducing the possibility that a gap occurs between metal laminate films and a bus bar having a large thickness, and a manufacturing method therefor.

Solutions to Problems

A film capacitor according to the present invention includes: a film capacitor element; a bus bar connected to the film capacitor element; and an exterior member which covers the film capacitor element and the bus bar; wherein the exterior member is formed of a metal laminate film, the metal laminate film having a first resin layer on a surface facing the film capacitor element, a part of the bus bar is exposed to an outside of the exterior member, and a second resin layer containing an acid-modified resin is formed between the first resin layer and the bus bar at an exposing port of the exterior member through which the part of the bus bar is exposed from the exterior member.

A film capacitor manufacturing method according to the present invention is a method for manufacturing a film capacitor in which a film capacitor element and a bus bar connected to the film capacitor element are covered by an exterior member formed of a metal laminate film having a first resin layer as one of surfaces, the method including: bonding a resin sheet containing an acid-modified resin to the bus bar; and after the bonding, covering the film capacitor element and the bus bar using the exterior member so that a part of the bus bar is exposed to an outside of the exterior member and a first resin layer of the exterior member faces the film capacitor element, and heating a resin sheet containing the acid-modified resin disposed between the first resin layer and the bus bar in the exposing port of the exterior member through which the part of the bus bar is exposed to the outside of the exterior member so that the resin sheet is melted to form a second resin layer containing an acid-modified resin.

A film capacitor manufacturing method according to the present invention is a method for manufacturing a film capacitor in which a film capacitor element and a bus bar connected to the film capacitor element are covered by an exterior member formed of a metal laminate film having a first resin layer as one of surfaces, electrostatically coating the bus bar with acid-modified resin powder to form an acid-modified resin coated film; after the electrostatically coating, heating the acid-modified resin coated film so that the film is melted to form a baking-finish acid-modified resin coated film; and after the heating, covering the film capacitor element and the bus bar using the exterior member so that a part of the bus bar is exposed to an outside of the exterior member and a first resin layer of the exterior member faces the film capacitor element, and heating a resin sheet containing the baking-finish acid-modified resin disposed between the first resin layer and the bus bar in the exposing port of the exterior member through which the part of the bus bar is exposed to the outside of the exterior member so that the resin sheet is melted to form a second resin layer containing an acid-modified resin.

Advantageous Effect of Invention

The present disclosure makes it possible to reduce the possibility that a gap occurs between the metal laminate films and the bus bar which has a thickness large enough to allow a flow of a large current in the film capacitor.

DESCRIPTION OF EMBODIMENTS

Prior to descriptions of embodiments in the present disclosure, the configuration of a conventional film capacitor and problems caused by the configuration are described.

In a film capacitor for use in a hybrid electric vehicle (HEV) or an electric vehicle (EV), a large current flows in bus bars (external terminals) in many cases. For this reason, bus bars having a comparatively large thickness need to be used in the film capacitor.

Figure 13:
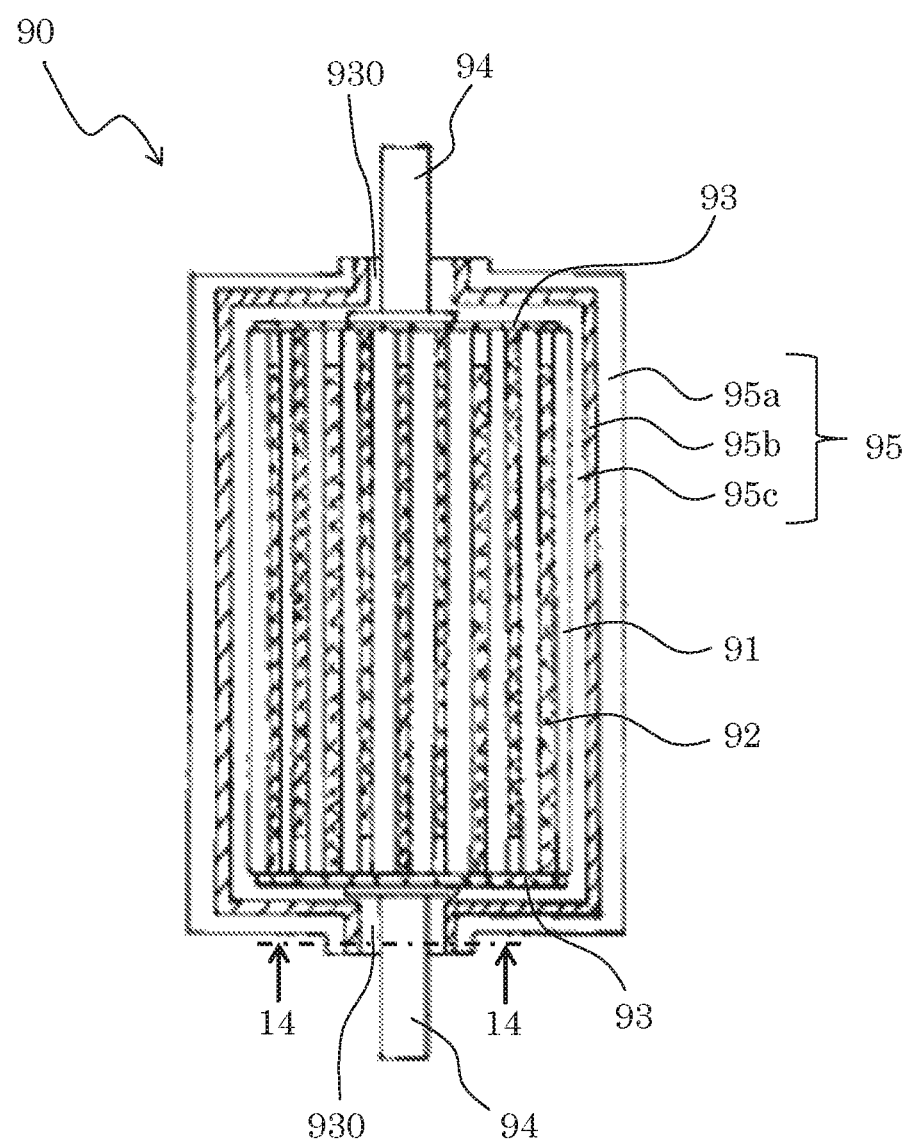
FIG. 13 is a cross-sectional view of a conventional film capacitor.

FIG. 13 is a cross-sectional view of conventional film capacitor 90. Conventional film capacitor 90 includes: polyvinylidene difluoride resin films 91; deposited metal layers 92; electrodes 93 (corresponding to metal-sprayed electrodes); bus bars 94; and metal laminate films 95. Each metal laminate film 95 includes: outer surface resin layer 95a; metal layer 95b; and inner surface resin layer 95c. Outer surface resin layer 95a and inner surface resin layer 95c are plastic layers having a thickness of approximately 30 μm. Metal layer 95b is an aluminum layer having a thickness of approximately 40 μm.

In film capacitor 90, a capacitor element is formed by stacking and winding a pair of polyvinylidene difluoride resin films 91 each having a surface formed of deposited metal layer 92 obtained by depositing a metal such as aluminum, zinc, or an alloy of these. Next, electrodes 93 are formed by thermal spraying a metal such as zinc on both of the end faces of the capacitor element. Furthermore, each external terminal 94 is fixedly connected to a corresponding one of electrodes 93 of the capacitor element. Next, the capacitor element is covered by metal laminate films 95, and the outer edges of metal laminate films 95 are heat sealed so that the capacitor element is sealed by metal laminate films 95. In the heat sealing process, corresponding three sides of respective metal laminate films 95 are heat sealed to be closed first. Next, a predetermined heating process is performed. Subsequently, the other corresponding sides of respective metal laminate films 95 are heat sealed. External terminals 94 are exposed to the outside through exposing ports 930. In this way, film capacitor 90 is formed.

Figure 14:
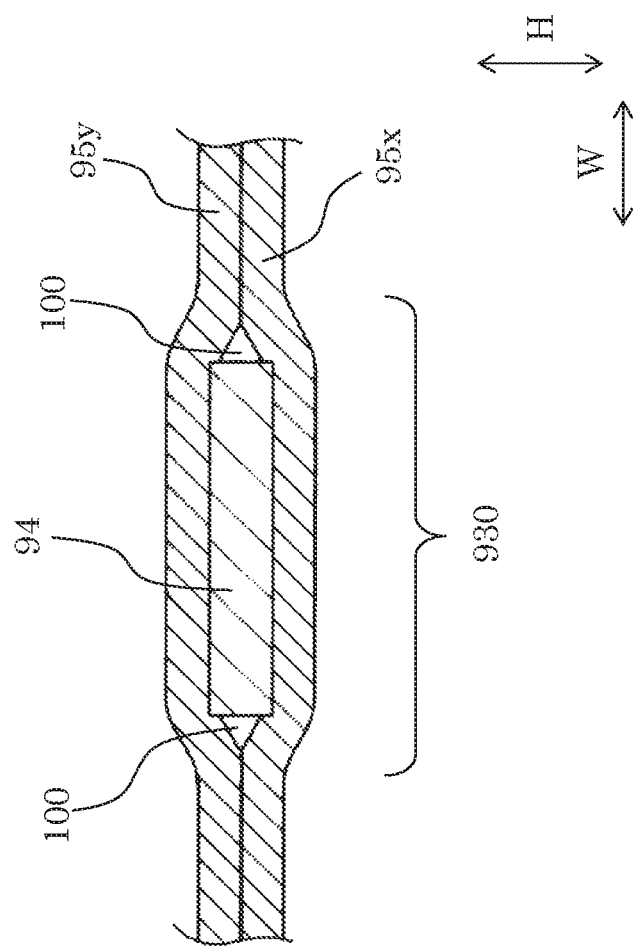
FIG. 14 is a cross-sectional view of a part around the exposing port in the conventional film capacitor.

FIG. 14 is a cross-sectional view of a part around one of the exposing ports in FIG. 13 when being cut along a cutting line 14-14.

Bus bar 94 passes through exposing port 930 of metal laminate films 95 to be exposed to the outside of metal laminate films 95. However, when bus bar 94 has a large thickness, even when lower laminate film 95x and upper laminate film 95y are heat sealed, a slight gap (openings 100) occurs around both of the edges of lower laminate film 95x and upper laminate film 95y in the width (W) direction due to the large thickness of bus bar 94 (the dimension in the height (H) direction).

Opening 100 is a factor of reducing properties of film capacitor 90. Occurrence of Opening 100 increases the possibility that water infiltrates inside metal laminate films 95 through opening 100. Water infiltrated inside metal laminate films 95 oxidizes electrode 93 and deposited metal layers 92. Oxidization of deposited metal layers 92 causes deterioration in various properties, such as decrease in capacity, of film capacitor 90.

In this way, it is difficult to bring lower laminate film 95x, upper laminate film 95y, and bus bar 94 in full contact with each other in exposing port 930 in film capacitor 90.

Hereinafter, embodiments are described in detail with reference to the drawings.

It is to be noted that each of the embodiments described below indicates a generic or specific example. The numerical values, shapes, materials, constituent elements, the arrangement and connection of the constituent elements, steps, the processing order of the steps etc. shown in the following embodiments are mere examples, and therefore do not limit the present invention to those disclosed herein. In addition, among the constituent elements in the following embodiments, constituent elements not recited in any one of the independent claims indicating the most generic inventive concept are described as arbitrary constituent elements.

Embodiment 1

Hereinafter, the configuration of a film capacitor according to Embodiment 1 and a manufacturing method therefor are described with reference to the drawings.

Figure 1:
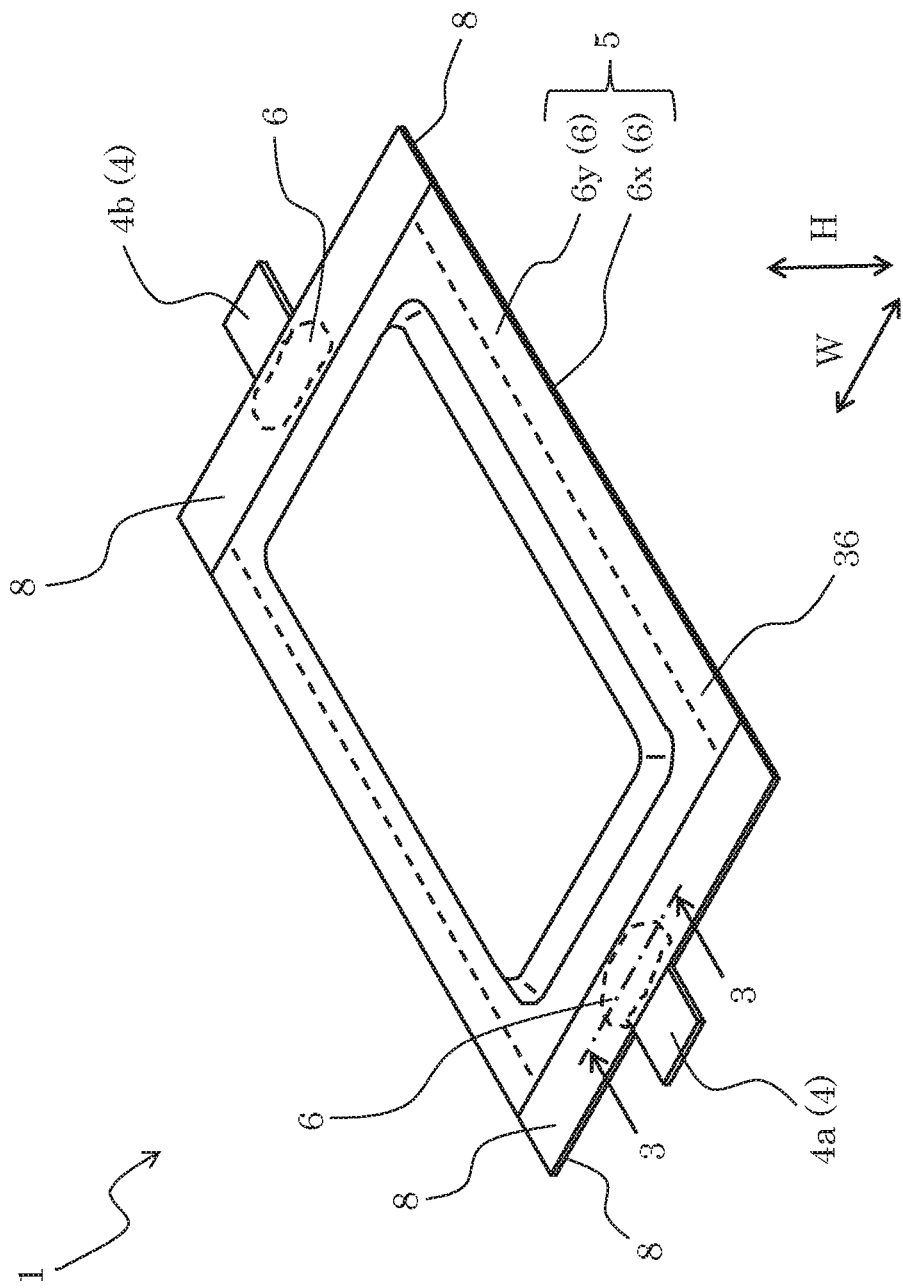
FIG. 1 is a perspective view of a film capacitor according to Embodiment 1.
Figure 2:
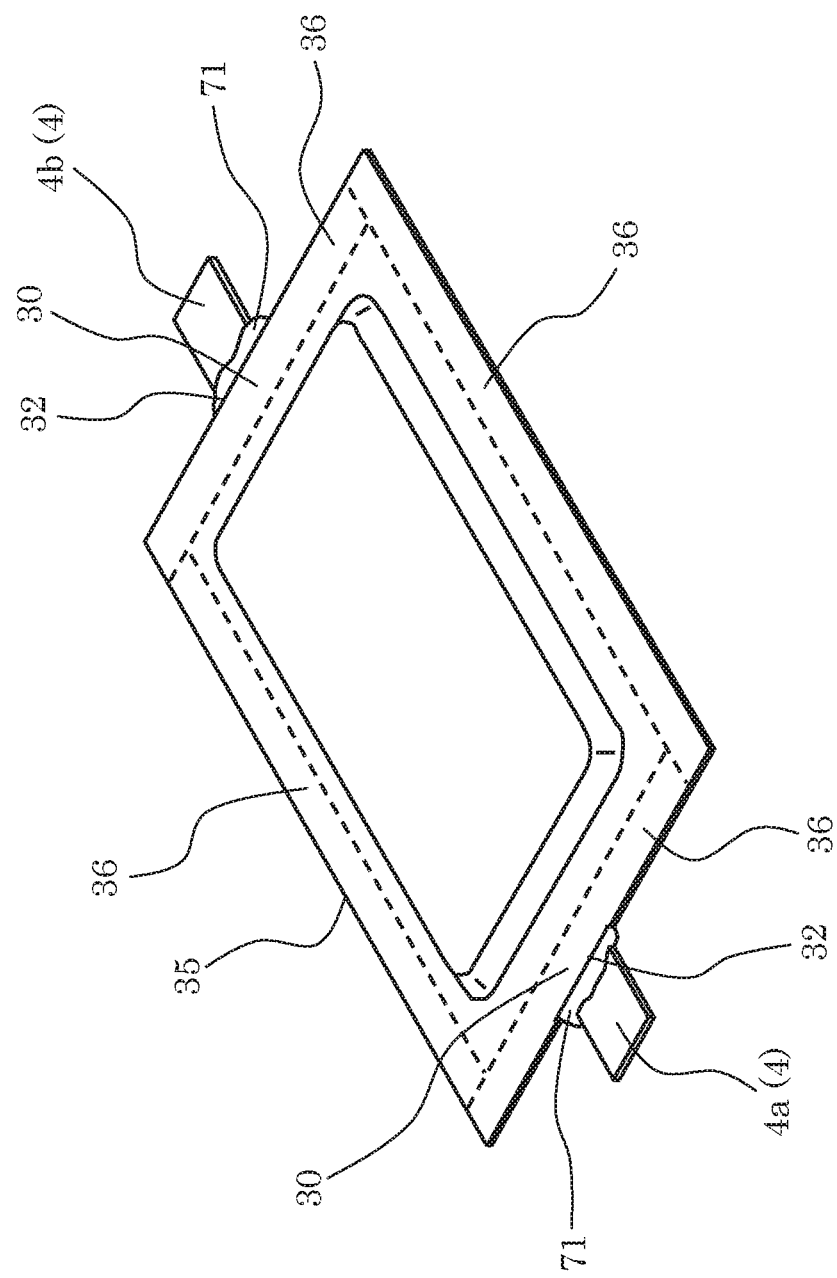
FIG. 2 is a perspective view of a film capacitor after removal of third resin layers according to Embodiment 1.
Figure 3:
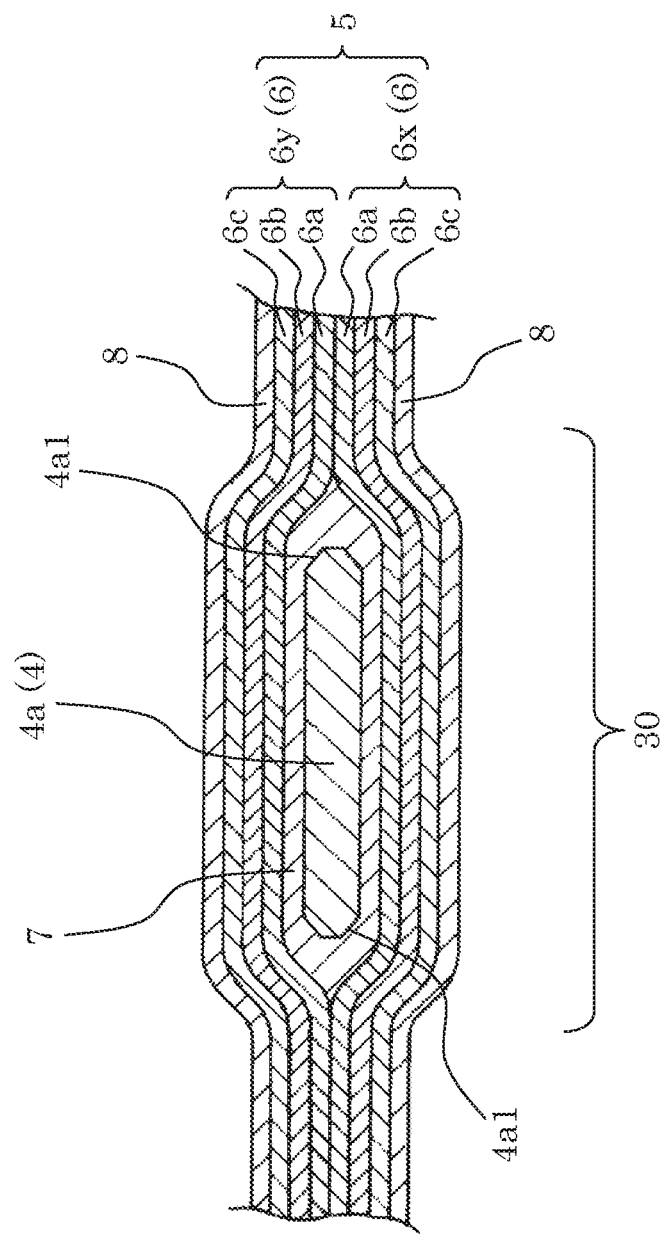
FIG. 3 is a cross-sectional view of a part around an exposing port according to Embodiment 1.

FIG. 1 is a perspective view illustrating a schematic configuration of film capacitor 1 according to Embodiment 1 of the present disclosure. FIG. 2 is a perspective view of film capacitor 1 obtained by removing third resin layer 8 from film capacitor 1 illustrated in FIG. 1. FIG. 3 is a partial cross-sectional view of film capacitor 1 along a cutting line 3-3 in FIG. 1.

Film capacitor 1 includes: film capacitor element 2 (see FIG. 5 described later); bus bar 4 connected to film capacitor element 2; and exterior member 5 which covers film capacitor element 2 and bus bar 4. Exterior member 5 is formed of metal laminate films 6. Each metal laminate film 6 has a surface of first resin layer 6a and facing film capacitor element 2. A portion of bus bar 4 is exposed to the outside of exterior member 5. In addition, in exposing port 3 of exterior member 5 in which the portion of bus bar 4 is exposed from exterior member 5, second resin layer 7 containing an acid-modified resin is formed between each of first resin layers 6a and bus bar 4.

With the configuration, it is possible to reduce the possibility that a gap occurs between each of metal laminate films 6 and bus bar 4 in film capacitor 1.

The configuration of film capacitor element 2 is described in detail based on the forming method therefor.

Film capacitor element 2 is a wound body obtained by winding stacked metalized films. A metalized film is obtained by depositing a metal layer (electrode) on at least one of sides of a dielectric film. A dielectric film is made of polypropylene (PP). The deposited metal layer is formed of aluminum. The pair of metalized films are stacked. Then, the stacked metalized films are wound to be the wound body. Subsequently, the wound body is processed by being pressed to be flat. In the resulting flat wound body, zinc is thermal sprayed on two opposing end faces so that a metal-sprayed electrode is formed. Accordingly, film capacitor element 2 has a flat shape. The capacitor part of film capacitor element 2 has a configuration in which the deposited metal layers face each other via the dielectric film.

Exterior member 5 is formed of metal laminate films 6. Exterior member 5 has lower laminate film 6x and upper laminate film 6y. Film capacitor element 2 and bus bar 4 are disposed between lower laminate film 6x and upper laminate film 6y. In other words, film capacitor element 2 and bus bar 4 are covered in such a manner that they are wrapped by metal laminate films 6 from above and below.

Metal laminate film 6 has a configuration in which inner resin layer 6a, metal layer 6b, and outer resin layer 6c are stacked and integrated. Here, the first resin layer corresponds to inner resin layer 6a. Inner resin layer 6a, metal layer 6b, and outer resin layer 6c are made of polypropylene, aluminum, and nylon, respectively. In addition, inner resin layer 6a, metal layer 6b, and outer resin layer 6c have thicknesses of 80 µm, 40 µm, and 25 µm, respectively. Metal laminate film 6 is an example of exterior member 5.

Bus bar 4 is connected to the metal-sprayed electrode of film capacitor element 2. To one of the deposited electrodes which has one of the polarities, an end of bus bar 4a is connected via one of the metal-sprayed electrodes. In addition, to the other deposited electrode having the other polarity, an end of bus bar 4b is connected via the other metal-sprayed electrode. As for methods for connecting bus bars 4a and 4b and the metal-sprayed electrodes, for example, soldering, resistance welding, etc. can be used.

The portion of each of bus bars 4a and 4b extends to the outside of exterior member 5 through a corresponding one of exposing ports 30 of exterior member 5. In other words, the portion of each of bus bars 4a and 4b is exposed from metal laminate films 6. Bus bar 4 to be connected to film capacitor 1 has a thickness of not less than 0.6 mm and not greater than 2.0 mm. Here, the thickness of bus bar 4 is a dimension of bus bar 4 in the direction (H direction in FIG. 1) in which lower laminate film 6x and upper laminate film 6y are stacked.

As illustrated in FIG. 3, second resin layer 7 containing an acid-modified resin is formed to cover bus bar 4a. In other words, second resin layer 7 is formed between the surface of bus bar 4a and each of inner resin layers 6a of metal laminate films 6. Second resin layer 7 is in close contact with inner resin layers 6a of metal laminate films 6 and the surface of bus bar 4a. In this way film capacitor element 2 is sealed inside exterior member 5. The acid-modified resin is, for example, an acid-modified PP.

As illustrated in FIG. 2, each of bus bars 4 extends from film capacitor element 2 beyond outer edge 32 of exposing port 30 to the outside of metal laminate films 6. In addition, second resin layer 7 has protrusion 71 which protrudes from outer edge 32 to the outside of exterior member 5 formed of metal laminate films 6. In other words, in protrusion 71, second resin layer 7 is exposed from metal laminate films 6. With second resin layer 7 in protrusion 71, it is possible to prevent a short circuit between metal layers 6b of metal laminate films 6 and bus bar 4.

As illustrated in FIG. 3, bus bar 4a has a cross section in a shape of a rectangle whose four apexes are chamfered, and thus has chamfered portions 4a1. Since bus bar 4a has chamfered portions 4a1, inner resin layers 6a of metal laminate films 6 easily fit the surface shape of bus bar 4a. In this way, it is also possible to reduce occurrence of a gap (opening) between bus bar 4a and inner resin layers 6a of metal laminate films 6.

In addition, as illustrated in FIG. 1, third resin layers 8 are formed to cover a portion of an exposed part of bus bar 4 exposed from metal laminate films 6, portions of metal laminate films 6, and protrusion 71 of second resin layer 7. Third resin layers 8 are formed at the respective sides of each bus bar 4 in the thickness direction (H direction in FIG. 1) of bus bar 4. In other words, two third resin layers 8 are provided on a per bus bar 4 basis. A resin different from resins used for first resin layers 6a and second resin layer 7 is used for third resin layers 8. In addition, third resin layers 8 are provided as bodies different from first resin layers 6a and second resin layer 7. As third resin layers 8, polyimide tapes can be used. Third resin layers 8 are bonded to metal laminate films 6, bus bar 4, and protrusion 71 of second resin layer 7 via bonding layers (not illustrated). As described later, it is desirable that the resin that forms third resin layers 8 have a softening point of 220 degrees Celsius or above.

(Manufacturing Method)

Hereinafter, a method for manufacturing film capacitor 1 according to Embodiment 1 is described.

(Bonding Process)

Figure 4:
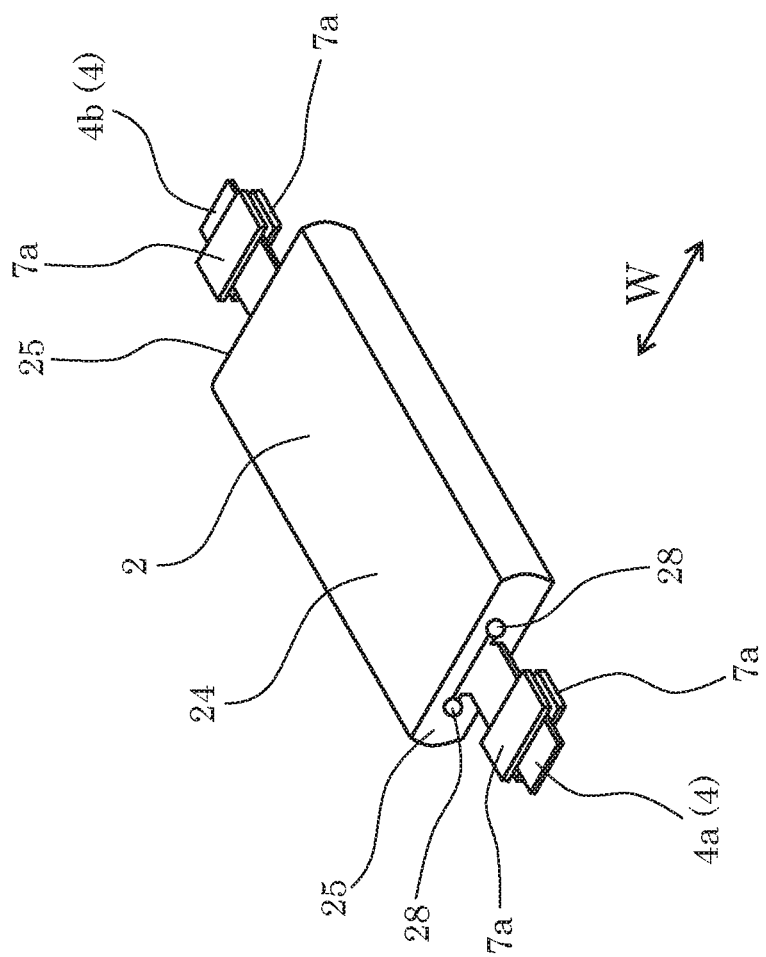
FIG. 4 is a diagram illustrating a bonding process according to Embodiment 1.

FIG. 4 is a diagram illustrating a bonding process according to Embodiment 1. The bonding process is described with reference to FIG. 4.

First, aluminum is deposited on one of the sides of dielectric films made of PP to form metalized films each having a deposited metal layer (deposited electrode). Although aluminum is used as the deposited metal material in this embodiment, it is to be noted that other materials such as zinc, magnesium, or a mixture of these metals may be used.

Next, a metalized film for one of the polarities and a metalized film for the other polarity are stacked with a shift at the edges in the width direction and wound so as to form a wound body having a long cylindrical shape. Next, the curved outer peripheral surface of the wound body is pressed from both sides in the diameter direction of the wound body so as to process the wound body to be flat. Next, zinc is thermal sprayed onto two opposing end faces of resulting flat wound body 24 so as to form metal-sprayed electrodes 25. In this way, film capacitor element 2 which has a capacitor part in which deposited metal layers face each other via the dielectric film is completed. Next, an end of bus bar 4a is connected to one of metal-sprayed electrodes 25 by soldering. In this way, one of the deposited electrodes which has one of the polarities is electrically connected to bus bar 4a via the one of metal-sprayed electrodes 25. Likewise, the other deposited electrode which has the other polarity is electrically connected to bus bar 4b via the other metal-sprayed electrode 25. As illustrated in FIG. 4, bus bar 4a is connected to metal-sprayed electrode 25 at soldered parts 28.

Next, resin sheet 7a is prepared. Resin sheet 7a is obtained by forming an acid-modified resin layer (not illustrated) on a base resin layer (not illustrated). The acid-modified resin layer is made of, for example, an acid-modified PP. As illustrated in FIG. 4, the acid-modified resin layers of resin sheets 7a are pressed on both of the surfaces of bus bar 4 in the thickness direction so as to bond resin sheets 7a to bus bar 4. Although sheets each configured to have two layers of a base resin layer and an acid-modified layer are used as resin sheets 7a, it is to be noted that sheets are not limited thereto. Resin sheets 7a may be, for example, sheets in which an acid-modified resin is mixed in a base resin. In short, such an acid-modified resin included in resin sheets 7a provides an advantageous effect of being able to reduce occurrence of a gap in exposing port 30.

(Sealing Process)

Figure 5:
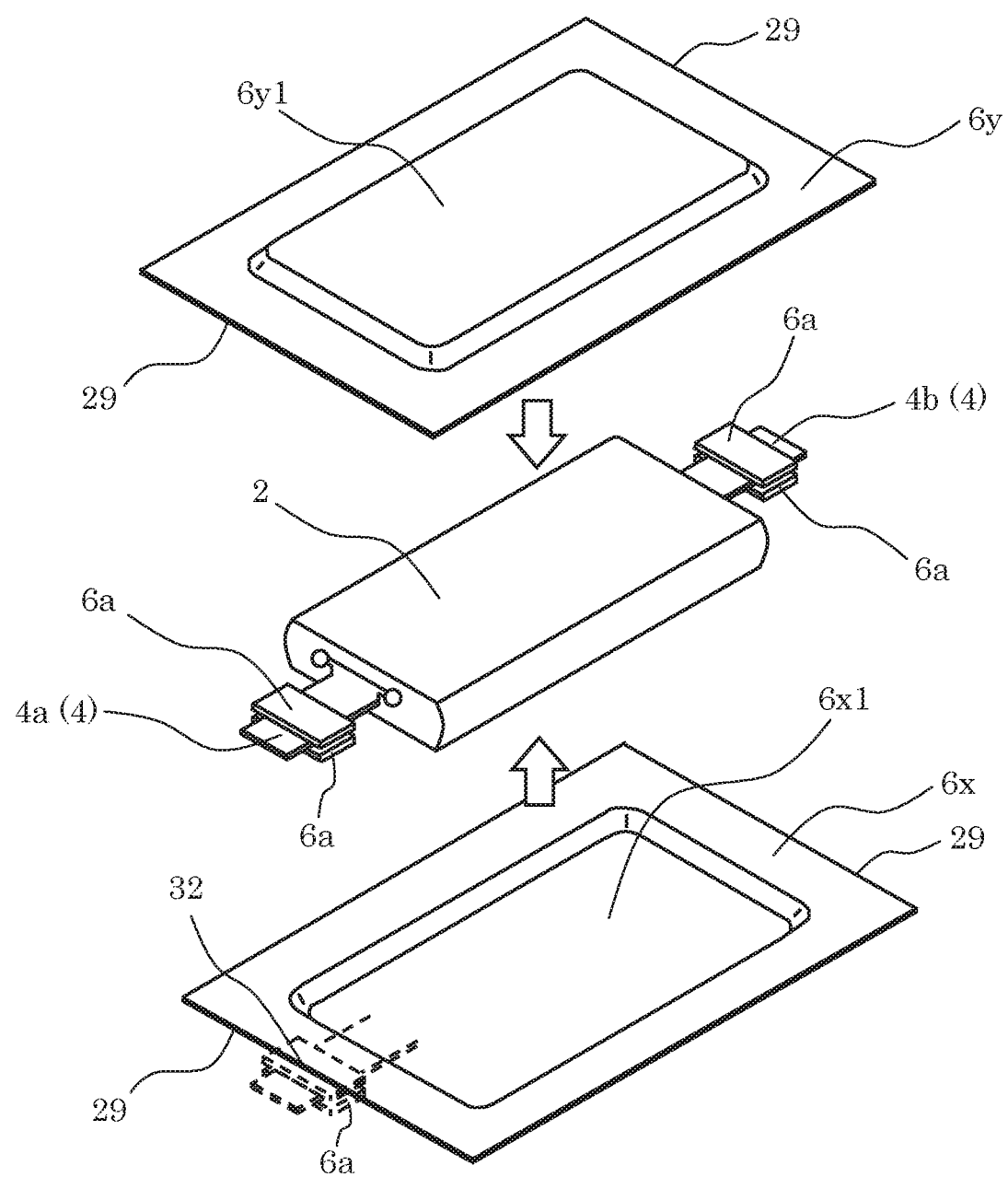
FIG. 5 is a diagram illustrating a sealing process according to Embodiment 1.
Figure 6:
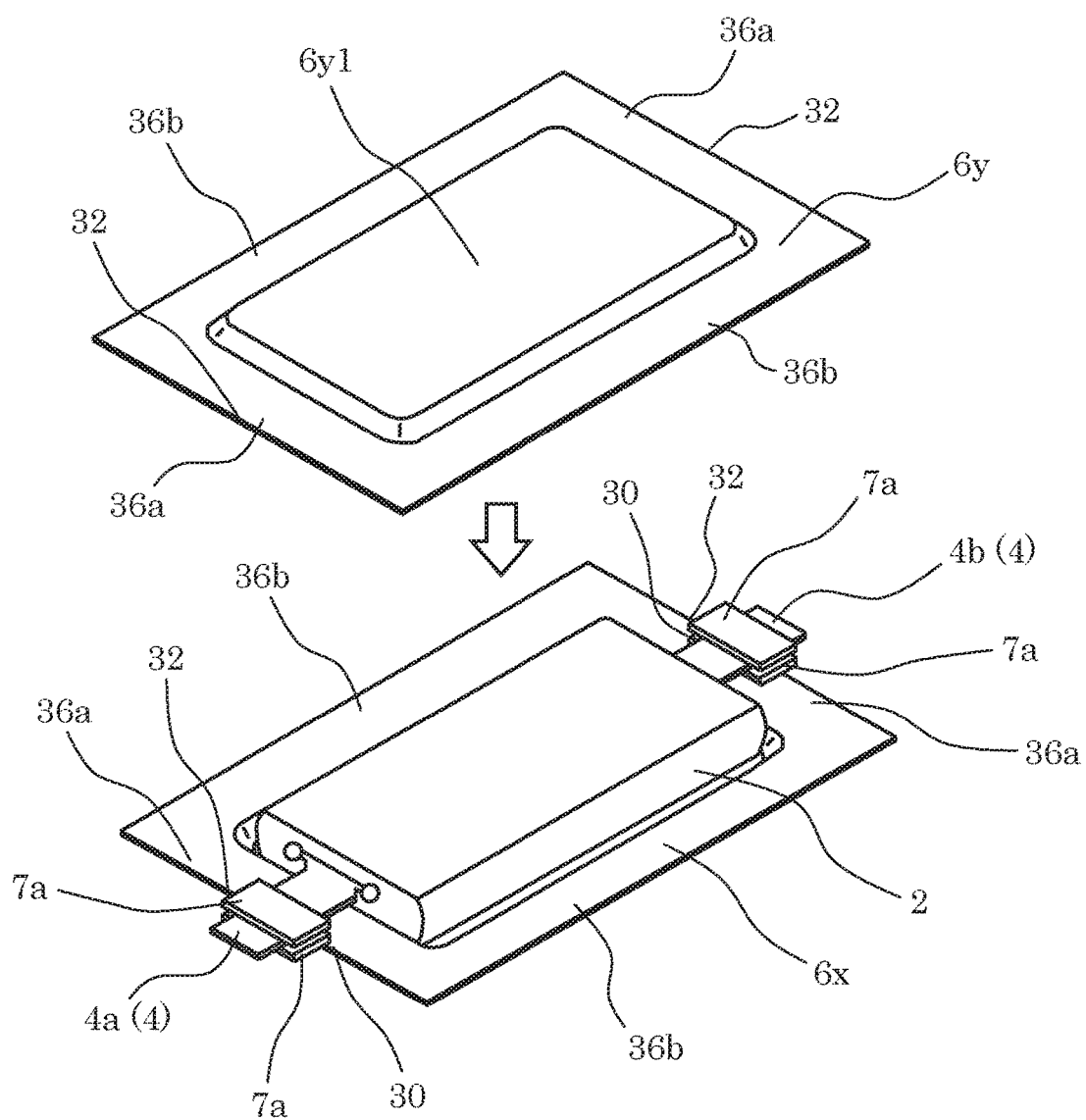
FIG. 6 is a diagram illustrating a sealing process according to Embodiment 1.

Next, a sealing process is described with reference to FIGS. 5 and 6. FIG. 5 is a diagram illustrating a sealing process according to Embodiment 1. FIG. 6 is a diagram illustrating a sealing process according to Embodiment 1. First, lower laminate film 6x and upper laminate film 6y are prepared. As illustrated in FIG. 5, each of lower laminate film 6x and upper laminate film 6y has, at its center part, a corresponding one of element housing parts (recesses) 6x1 and 6y1 for housing film capacitor element 2. As illustrated in FIG. 6, film capacitor element 2 to which bus bars 4a and 4b are connected is mounted on lower laminate film 6x so that the lower part of film capacitor element 2 is housed in element housing part 6x1 of lower laminate film 6x. In FIG. 5, the dotted lines are virtual lines which depict bus bar 4a and resin sheets 7a after being mounted. As illustrated by the dotted lines of FIG. 5 and in FIG. 6, resin sheets 7a are positioned at the outside of outer edge 32 of lower laminate film 6x.

Next, as illustrated by arrows in FIG. 6, film capacitor element 2 to which bus bars 4a and 4b are connected is mounted on upper laminate film 6y so that the upper part of film capacitor element 2 is housed in element housing part 6y1 of upper laminate film 6y. Resin sheets 7a are partly positioned at the outside of outer edge 32 of upper laminate film 6y.

Through the above processes, as shown by arrows in FIG. 5, film capacitor element 2 and bus bars 4 are wrapped by lower laminate film 6x and upper laminate film 6y from above and below. At this time, the parts of bus bars 4 are exposed to the outside of metal laminate films 6 through exposing ports 30 of metal laminate films 6.

Next, a resin having a softening point of 220 degrees Celsius or above is prepared for third resin layers 8. In this embodiment, polyimide is used as a material for third resin layers 8. More specifically, polyimide tapes each having a bonding layer (not illustrated) on its surface are used as third resin layers 8. As illustrated in FIG. 1, the polyimide tapes are bonded, using the bonding layer, to cover portions of exposed parts of bus bar 4 exposed from metal laminate films 6, and resin sheets 7a protruding from metal laminate films 6. One of the two polyimide tapes in total for each bus bar 4 is bonded to each of the both sides of bus bar 4 in the thickness direction (H direction in FIG. 1). In other words, one of the polyimide tapes is bonded to end part 36a of lower laminate film 6x and bus bar 4, and the other polyimide tape is bonded to end part 36a of upper laminate film 6y and bus bar 4.

Next, end parts 36a, 36a, 36b, and 36b at the four sides of lower laminate film 6x and upper laminate film 6y are sandwiched by the contact parts of a heat sealing machine in an atmosphere having a reduced pressure, and are heated and pressurized to be heat sealed. Next, the pressure is returned to a normal pressure. In this way, first resin layers 6a of lower laminate film 6x and upper laminate film 6y are heat sealed. Four end parts 36a, 36a, 36b, and 36b become four heat sealed parts 36. In FIG. 2, dotted lines are provided for convenience to show the borders between four end parts 36a, 36a, 36b, and 36b.

Figure 7:
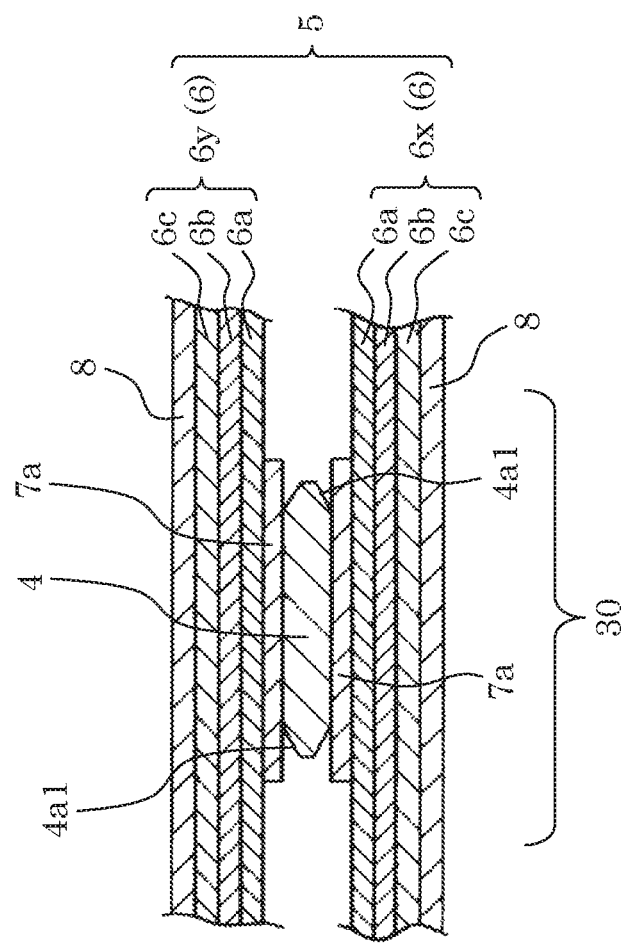
FIG. 7 is a cross-sectional view of a part around an exposing port before being heated and pressurized according to Embodiment 1.

FIG. 7 is a cross-sectional view illustrating a part around exposing port 30 before being heated and pressurized. In exposing port 30, bus bar 4, resin sheets 7a, metal laminate films 6, and third resin layers 8 are stacked. Third resin layers 8 are polyimide tapes. In addition, FIG. 3 is a cross-sectional view illustrating the part around exposing port 30 after being heated and pressurized. Resin sheets 7a are heated to be melted and form second resin layer 7. Second resin layer 7 is formed around bus bar 4 to seal exposing port 30. As illustrated in FIG. 2, parts of second resin layers 7 protrude from outer edges 32 of exposing ports 30 to the outside of metal laminate films 6. In this way, protrusions 71 are formed. It is to be noted that, in FIG. 2, polyimide tapes which are third resin layers 8 are not illustrated in order to clearly illustrate the states of protrusions 71. Actually, protrusions 71 are covered by third resin layers 8.

Here, it is desirable that bus bar 4 have a thickness of not less than 0.6 mm and not greater than 2.0 mm. In the case where bus bar 4 has a thickness of 0.6 mm or below, there is a little possibility that gap (opening) 100 in FIG. 13 occurs. Even in this case, the need to provide second resin layer 7 is low although providing second resin layer 7 enables further reduction in the possibility that a gap occurs. Stated differently, film capacitor 1 having bus bar 4 whose thickness is 0.6 mm or above makes it possible to enjoy the advantageous effect of the present disclosure more significantly. In addition, in the case of using a film capacitor according to this embodiment as a film capacitor for an HEV or an EV, it is desirable that bus bar 4 have a thickness of 0.6 mm or above. With this configuration, it is possible to cause a large current to flow in bus bar 4.

In addition, when bus bar 4 has a thickness exceeding 2.0 mm, gap (opening) 100 illustrated in FIG. 13 becomes too large. For this reason, even if second resin layer 7 is formed, there is a possibility that a gap occurs in exposing port 30.

It is to be noted that the polyimide tapes are large enough to fully cover protrusions 71. For this reason, in the sealing process, polyimide tapes 8 are present between protrusions 71 of second resin layer 7 and the contact parts of the heat sealing machine. In this way, protrusions 71 are never bonded in contact with the contact parts of the heat sealing machine, which never reduces operability of the sealing process.

Although a polyimide is used as a resin which forms third resin layers 8, it is to be noted that resins are not limited thereto. It is desirable that third resin layers 8 be made of a material having a softening point of 220 degrees Celsius or above. In the process for heat sealing first resin layers 6a of metal laminate films 6, heating temperatures at the time of heat sealing approximately ranges from 180 to 210 degrees Celsius. For this reason, when third resin layers 8 have a softening point of 220 degrees Celsius or above, third resin layers 8 never change in shape and quality at the time of being heat sealed. In this way, it is possible to prevent protrusions 71 from being bonded to the contact parts.

In addition, with the presence of protrusions 71, it is possible to sufficiently secure creepage distances between metal layers 6b exposed at edges (cut faces) 29 (see FIG. 5) of metal laminate films 6 and bus bars 4a and 4b. In this way, it is possible to prevent a short circuit between metal layers 6b and bus bars 4a and 4b.

Although sheets each configured to have two layers of a base resin layer and an acid-modified layer are used as resin sheets 7a, it is to be noted that sheets are not limited thereto. Resin sheets 7a may be, for example, sheets in which an acid-modified resin is mixed in a base resin. In other words, when resin sheets 7a contain an acid-modified resin, the same advantageous effect obtainable when two-layer resin sheets 7a are used can be provided. More specifically, as illustrated in FIG. 3, resin sheets 7a are formed as second resin layer 7 around bus bar 4 through heating and pressurizing processes. For this reason, an advantageous effect of being able to reduce occurrence of a gap in exposing port 30 can be provided.

Through the above processes, film capacitor 1 according to Embodiment 1 is completed.

In the above sealing process, the bus bar used therein is bus bar 4 to both surfaces of which plate-shaped resin sheets 7*a* are bonded in the thickness direction (short-hand direction in the cross section) of bus bar 4 as illustrated in FIG. 7. However, bus bars are not limited thereto. For example, a bus bar having circular resin sheets (circular resin members) may be used. Circular resin sheets can be formed using a manufacturing method below. First, plate-shaped resin sheets 7*a* are bonded to both surfaces of independent bus bar 4 in the thickness direction (short-hand direction of the cross section of bus bar 4). Next, bus bar 4 to which resin sheets 7*a* are bonded is processed by a press machine in a state of being heated and pressurized. In this process, resin sheets 7*a* are deformed to be fit to and brought into close contact with the surface of bus bar 4. Next, the bus bar on which the circular resin sheets are formed is connected to a metal-sprayed electrode by soldering, resistance welding, or the like. As described above, in the sealing process, it is possible to use bus bar 4 having the circular resin sheets. Even when the sealing process according to this embodiment is used, the advantageous effect of being able to reduce occurrence of a gap in exposing port 30 can be provided.

(Variation 1)

In Embodiment 1, film capacitor element 2 having bus bar 4 to which resin sheets 7*a* are bonded is heat sealed in a state where film capacitor element 2 is sandwiched by metal laminate films 6. This variation is different from Embodiment 1 in the point of using acid-modified resin coated films 7*b* are used instead of resin sheets 7*a*. The other matters are the same as in Embodiment 1. In the description below, the differences from Embodiment 1 are mainly described. The common matters are provided with the same numerical references, and detailed descriptions thereof are not repeated.

(Acid-Modified Resin Coating Process)

Figure 8:
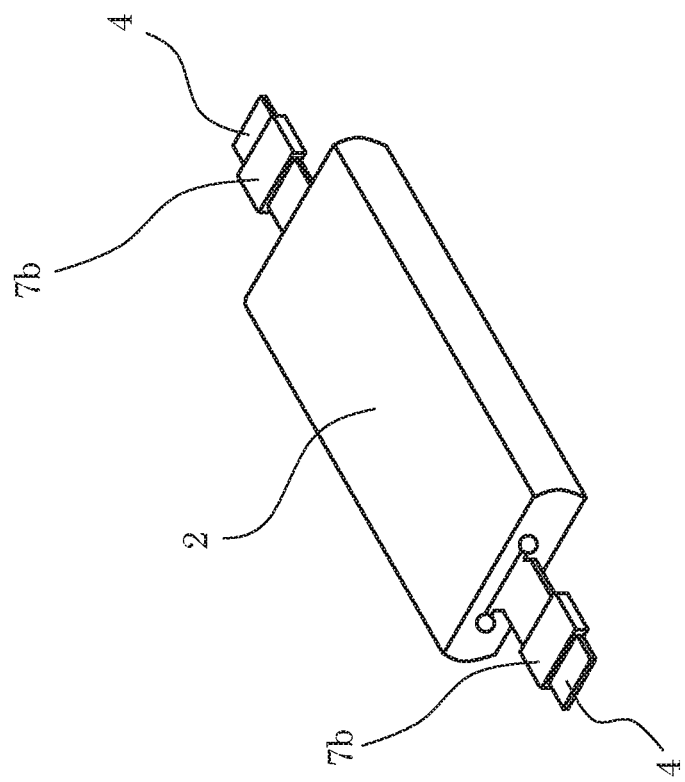
FIG. 8 is a diagram illustrating a process for coating an acid-modified resin according to Embodiment 2.

As in Embodiment 1, film capacitor element 2 to which bus bar 4 is attached is prepared. Next, as illustrated in FIG. 8, acid-modified resin coated films 7*b* are formed at predetermined positions (corresponding to exposing ports) of bus bar 4 using electrostatic coating. Electrostatic coating is a coating for depositing acid-modified PP powder by spraying charged acid-modified PP powder at predetermined positions of bus bar 4 utilizing attraction of static electricity. As for electrostatic coating, it is possible to employ a tribo (friction) charging method. In the electrostatic coating, it is possible to cause a current at the time when negative charge of a gun flows to the earth to be approximately several μ amperes (A), for example, 2μ amperes, by adjusting a rotational frequency of the screw (discharge amount control) of an electrostatic coating machine, and a main air pressure (carriage pressure) and pressurizing an air pressure (charge amount control) of the electrostatic coating machine. In this way, it is possible to cause acid-modified resin coated films 7*b* to be uniform. Acid-modified PP powder is an example of acid-modified resin powder.

The use of electrostatic coating makes it possible to form acid-modified resin coated films 7*b* along the shapes of bus bars 4 which are coating targets easily and precisely. The electrostatic coating also makes it possible to form a large amount of acid-modified resin coated films 7*b* at one time. It is to be noted that areas which do not need to be coated may be masked when performing electrostatic coating. In this case, it is possible to coat the entire surface of the exposed parts which are not masked. By performing masking in this way, it is possible to prevent the areas from being unnecessarily coated.

(Acid-Modified Resin Baking Process)

Subsequently, acid-modified resin coated films 7*b* are heated to be melted. Acid-modified resin coated films 7*b* are melted to form baking-finish acid-modified resin coated films.

(Sealing Process)

Next, a sealing process is performed as in Embodiment 1. Through the sealing process, as illustrated in FIG. 3, second resin layer 7 containing an acid-modified PP is formed between each bus bar 4 and corresponding inner resin layer 6*a* of metal laminate film 6. In addition, as illustrated in FIG. 2, protrusions 71 are formed by parts of second resin layers 7 protruding from outer edges 32 of exposing ports 30 to the outside of metal laminate films 6.

Embodiment 2

In Embodiment 1, as illustrated in FIG. 3, second resin layer 7 containing an acid-modified PP is formed between bus bar 4 and inner resin layer 6*a* of metal laminate film 6. In this embodiment, fourth resin layer 9 is further formed between bus bar 4 and second resin layer 7, which is a difference from Embodiment 1. In the description below, the difference from Embodiment 1 is mainly described. The common matters are provided with the same numerical references, and detailed descriptions thereof are not repeated.

Figure 9:
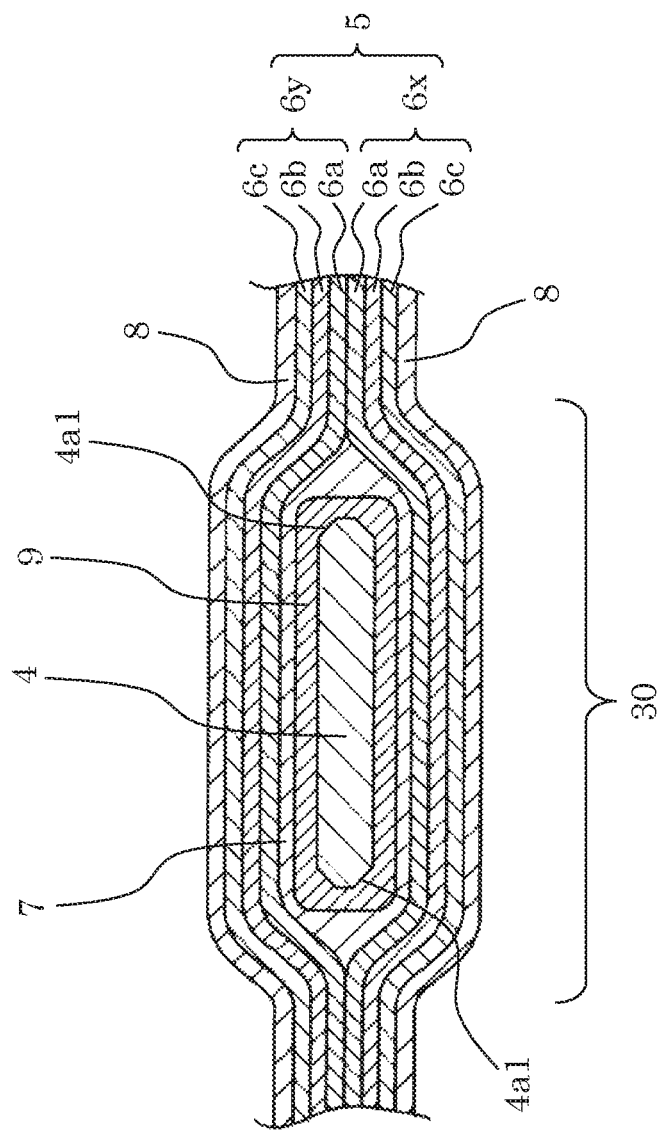
FIG. 9 is a cross-sectional view of a part around an exposing port according to Embodiment 3.

FIG. 9 is a cross-sectional view of a part around exposing port 30 in a film capacitor according to Embodiment 2.

As illustrated in FIG. 9, in addition to second resin layer 7, fourth resin layer 9 is formed between bus bar 4 and inner resin layers 6*a* of metal laminate films 6. Fourth resin layer 9 contains an epoxy resin. Fourth resin layer 9 is formed between bus bar 4 and second resin layer 7.

Considering conductivity, bus bar 4 is formed of copper or a copper alloy in many cases. However, the copper or copper alloy contained in bus bar 4 may accelerate deterioration of the acid-modified PP contained in second resin layer 7. In this embodiment, forming fourth resin layer 9 containing the epoxy resin between bus bar 4 and second resin layer 7 makes it possible to reduce acceleration in the deterioration of second resin layer 7 due to bus bar 4 made of copper or a copper alloy.

Hereinafter, a manufacturing method according to Embodiment 2 is described focusing on processes different from those in Embodiment 1.

(Epoxy Resin Layer Forming Process)

As in Embodiment 1, film capacitor element 2 to which bus bar 4 is attached is prepared. Next, epoxy resin liquid is provided at a predetermined position (corresponding to exposing port 30) of bus bar 4. The epoxy resin liquid may be resin liquid partly containing an epoxy resin. Examples of methods for providing the epoxy resin liquid include application, screen printing, etc. Next, the epoxy resin liquid is heated to be cured. In this way, the epoxy resin layer as fourth resin layer 9 is formed.

(Acid-Modified Resin Coating Process)

Next, a mask is formed on bus bar 4 on which fourth resin layer 9 is formed, in such a manner that a surface of fourth resin layer 9 is exposed instead of a surface part of bus bar 4. After the masking is performed, an acid-modified resin coated film is formed using electrostatic coating in such a manner that the exposed surface of fourth resin layer 9 is covered.

(Acid-Modified Resin Baking Process)

Subsequently, an acid-modified resin coated film is heated to be melted. The acid-modified resin coated film is melted to form a baking-finish acid-modified resin coated film.

(Sealing Process)

Next, a sealing process is performed as in Embodiment 1. Through the sealing process, second resin layer 7 containing an acid-modified PP is formed. Second resin layer 7 is a coated film obtained by baking an acid-modified resin to be melted. As illustrated in FIG. 9, the following layers are sequentially stacked on bus bar 4: fourth resin layer 9 containing an epoxy resin; second resin layer 7 containing an acid-modified PP; and inner resin layer 6a of metal laminate film 6. In addition, as illustrated in FIG. 2, protrusions 71 are formed by parts of second resin layers 7 protruding from outer edges 32 of exposing ports 30 to the outside of metal laminate films 6.

(Variation 2)

In the process for forming an epoxy resin layer according to Embodiment 2, fourth resin layer 9 is formed by using epoxy resin liquid. In this variation, fourth resin layer 9 is formed by using epoxy resin powder instead of the epoxy resin liquid, which is a difference from Embodiment 2. In the description below, the difference from Embodiment 1 is mainly described. The common matters are provided with the same numerical references, and detailed descriptions thereof are not repeated.

(Process for Applying Epoxy Resin)

An epoxy resin layer is formed using electrostatic coating as described in the process for applying an acid-modified resin according to Embodiment 2. In the electrostatic coating, it is good to mask bus bar 4 so as to prevent an area which does not need to be coated from being coated unnecessarily. Next, an epoxy resin coated film is formed on bus bar 4. More specifically charged epoxy resin powder is deposited at a predetermined position (corresponding to the exposing port) of bus bar 4 utilizing attraction of static electricity.

(Epoxy Resin Baking Process)

Subsequently, an epoxy resin coated film is heated to be melted. The epoxy resin coated film is melted to form a baked epoxy resin coated film.

The processes that follow this process are the same as the processes in Embodiment 1.

It is to be noted that the process for applying an epoxy resin and the process for baking the epoxy resin according to this embodiment may be performed before a bonding process also in Embodiment 1. More specifically, it is also possible to perform the subsequent processes using bus bar 4 on which a baking-finish epoxy resin coated film is formed, instead of bus bar 4 for use in the bonding process according to Embodiment 1.

Embodiment 3

Embodiment 3 is described with reference to FIGS. 10 to 12.

In this embodiment, exterior member 5 has folded parts at outer edges 32 of exposing ports 30, which is a difference from Embodiment 1 and Embodiment 2. The folded parts are folded to expose first resin layers 6a of exterior member 5. In the description below, the difference from Embodiment 1 is mainly described. The common matters are provided with the same numerical references, and detailed descriptions thereof are not repeated.

Figure 10:
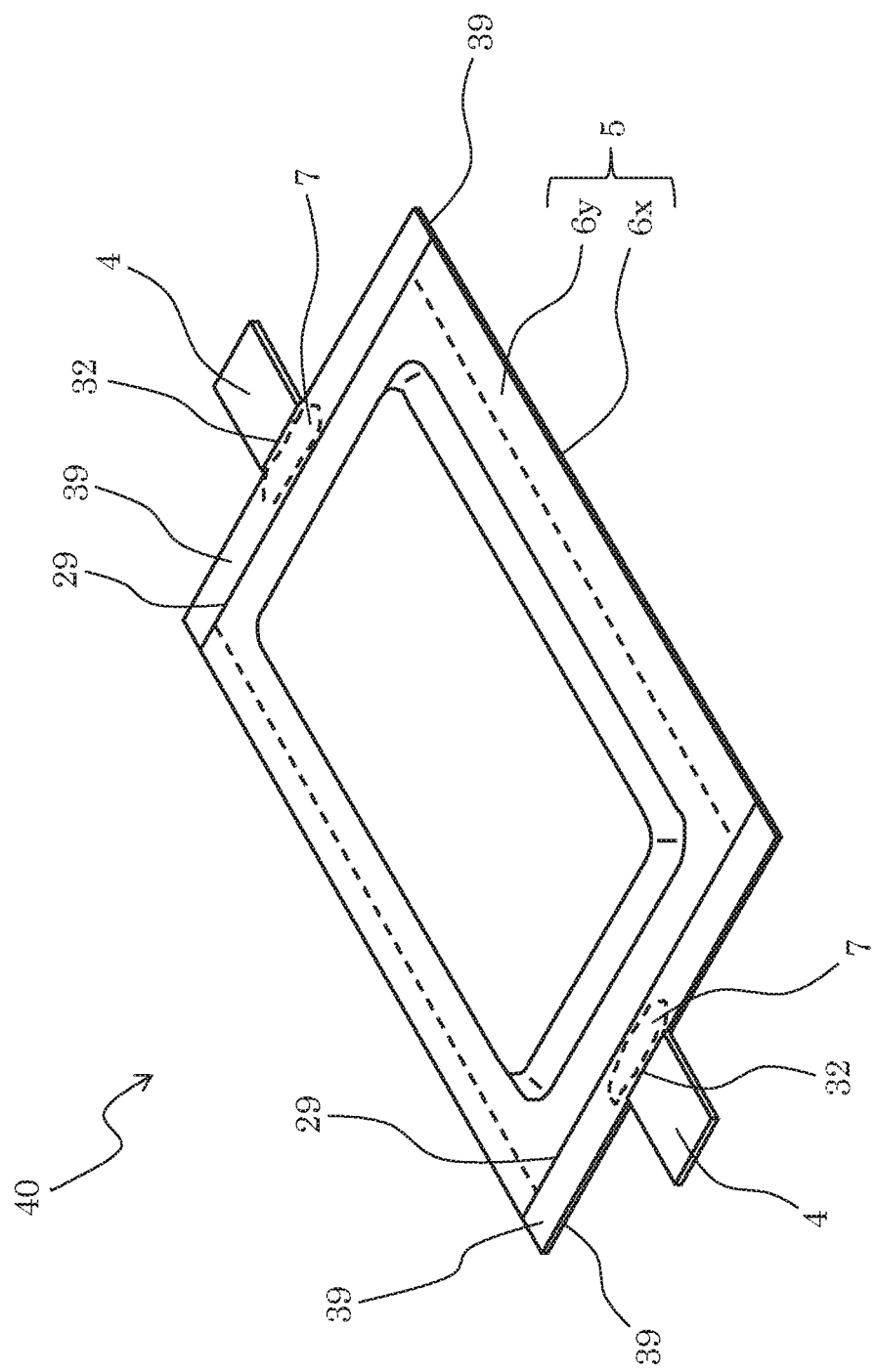
FIG. 10 is a perspective view of a film capacitor according to Embodiment 3.

FIG. 10 is a perspective view of film capacitor 40 according to this embodiment. FIG. 11 is a perspective view of film capacitor 40 before folded parts are formed according to this embodiment. FIG. 12 is a diagram illustrating the process for folding, in the sealing process, the parts of film capacitor 40 according to this embodiment.

In film capacitor 40 according to this embodiment, end parts 38a are areas within predetermined ranges from the respective edges of metal laminate films 6x and 6y along the sides along which exposing ports 30 are formed. Drawing ports 30 are formed inner than end parts 38a. In other words, exposing ports 30 are not formed on end parts 38a. End parts 38a of two metal laminate films 6x and 6y are not heated to be melted and bonded. End parts 38a of metal laminate films 6 are folded to expose first resin layers 6a. Folded parts 39 are folded end parts 38a.

Hereinafter, a manufacturing method therefor is described.

First, two independent metal laminate films 6x and 6y are prepared. At the same time, film capacitor element 2 to which bus bar 4 is connected is prepared. Resin sheets 7a are bonded to bus bar 4 in the same manner as in Embodiment 1.

(Sealing Process)

Film capacitor element 2 to which bus bar 4 is connected is mounted on lower laminate film 6x, in such a manner that the lower part of film capacitor element 2 is housed in element housing part 6x1 of lower laminate film 6x. Next, upper laminate film 6y is placed on film capacitor element 2 to which bus bar 4 is connected, in such a manner that the upper part of film capacitor element 2 is housed in element housing part 6y1 of upper laminate film 6y. Film capacitor element 2 and bus bar 4 connected to film capacitor element 2 are covered by both of metal laminate films 6.

Figure 11:
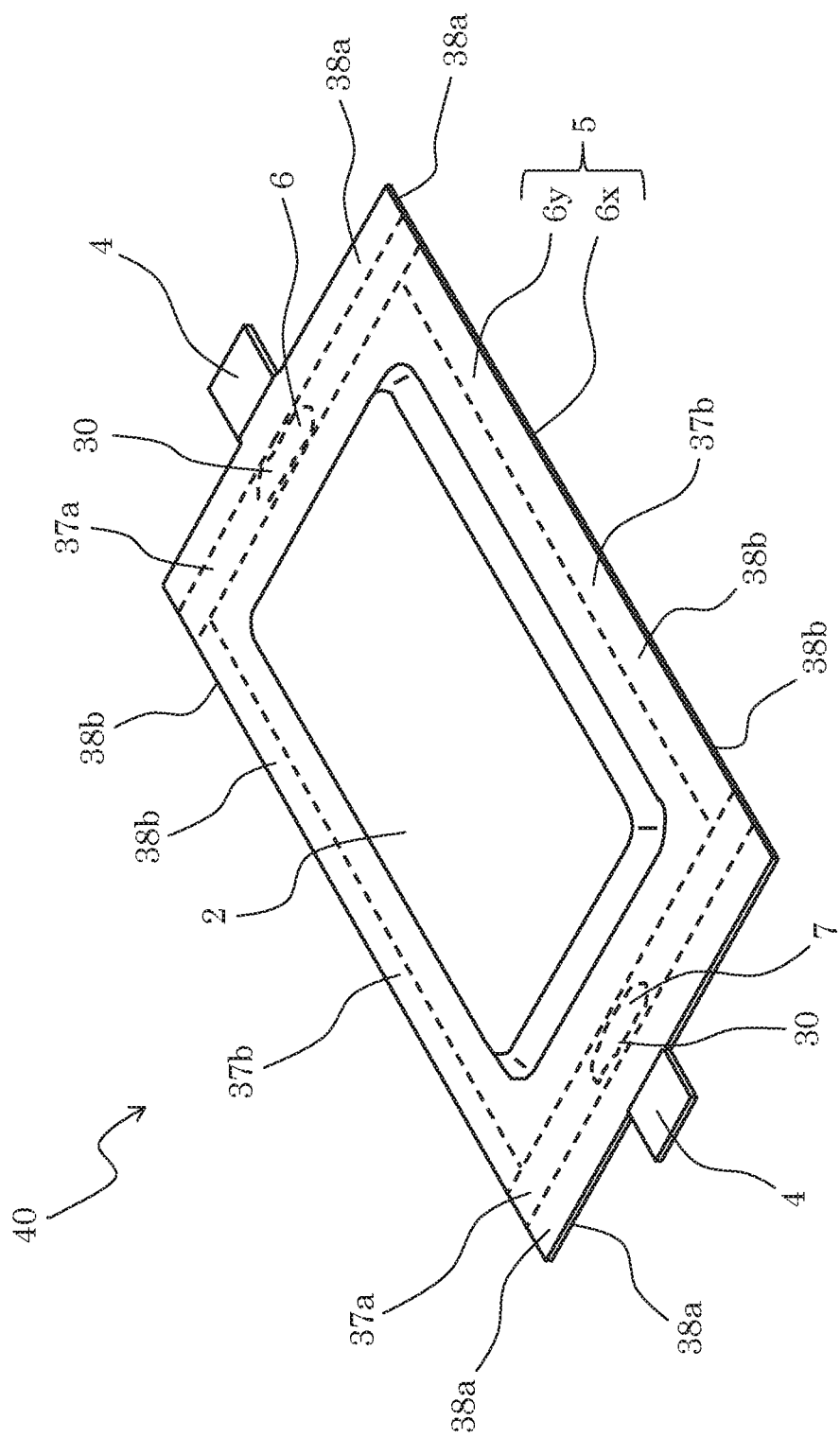
FIG. 11 is a diagram illustrating states of parts around exposing ports before being folded in a sealing process according to Embodiment 3.

Next, as illustrated in FIG. 11, four heat sealed parts 37a, 37a, 37b, and 37b each having a line shape are formed using a heat sealing machine. In FIG. 11, dotted lines are provided for convenience to show the borders between heat sealed parts 37a, 37a, 37b, and 37b. Two heat sealed parts 37b are formed on end parts 38b of metal laminate films 6x and 6y. End parts 38b are areas within predetermined ranges from the end parts of metal laminate films 6 along the sides on which exposing ports 30 are not formed. On the other hand, two heat sealed parts 37a are formed not at end parts 38a of metal laminate films 6x and 6y but at positions closer to the center part by predetermined distances from end parts 38a of metal laminate films 6x and 6y. Resin sheets 7a are arranged between two metal laminate films 6x and 6y on the parts corresponding to two heat sealed parts 37a before being heat sealed. Thus, after the heat sealing, second resin layer 7 is formed between two metal laminate films 6x and 6y on two heat sealed parts 37a. Here, metal laminate films 6 are not heat sealed in end parts 38a positioned outer than heat sealed parts 37a.

Figure 12:
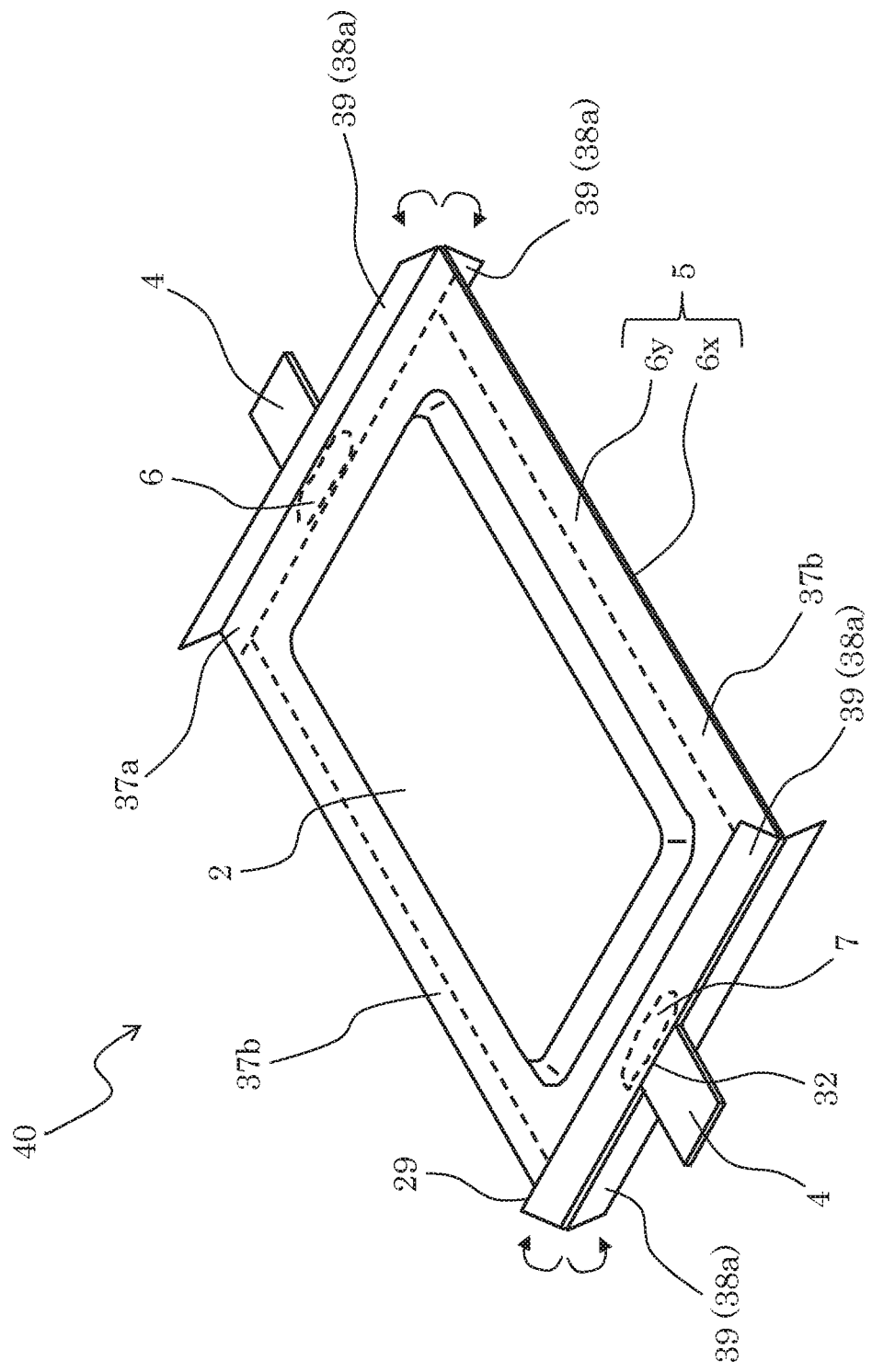
FIG. 12 is a diagram illustrating folding of the parts around the exposing ports in the sealing process according to Embodiment 3.

Next, as illustrated in FIG. 12, folded parts 39 are formed by folding end parts 38a of metal laminate films 6x and 6y in the direction shown by arrows. In other words, inner resin layers 6a (first resin layers) of metal laminate films 6 are exposed to the outside. Folded parts 39 are folded end parts 38a. In this way, film capacitor 1 illustrated in FIG. 10 is completed.

Differently to Embodiment 1, in film capacitor 40 according to Embodiment 3, outer edges 32 of exposing ports 30 are not edges 29 of metal laminate films 6x and 6y. In other words, with this configuration, it is possible to reduce the possibility that a short circuit occurs between bus bar 4 and metal layers 6b of metal laminate films 6. Since there is no possibility that a short circuit occurs between bus bar 4 and metal layers 6b of metal laminate films 6, it is to be noted that no protrusion 71 of second resin layer 7 needs to be provided. Furthermore, there is no need to form third resin layers 8 for preventing adherence of protrusion 71 and the contact parts of the heat sealing machine.

As described earlier, in a conventional film capacitor illustrated in FIG. 14, when bus bar 94 is thick, opening 100 occurs in exposing port 930 in the process for heat sealing lower laminate film 95x and upper laminate film 95y. For this reason, it is difficult to bring lower laminate film 95x, upper laminate film 95y, and bus bar 94 into full contact with each other in exposing port 930.

For this reason, water infiltrates inside metal laminate films 95 through opening 100. Furthermore, the infiltrated water oxidizes deposited electrodes 93a and 93b. For this reason, in the film capacitor, various kinds of capacitor characteristics such as decrease in capacity may decrease.

On the other hand, in the present disclosure, second resin layer 7 containing an acid-modified resin is formed between thick bus bar 4 and inner resin layers 6a of metal laminate films 6 as illustrated in FIG. 3. For this reason, even in the case of thick bus bar 4, there is little possibility that an opening occurs in exposing port 30. Thus, there is little possibility that water infiltrates inside metal laminate films 6. Therefore, it is possible to reduce deterioration in various kinds of capacitor characteristics such as decrease in capacity due to oxidization etc. of deposited electrodes. Accordingly, the present disclosure is applicable to film capacitors etc. for HEVs and EVs for which thick bus bars 4 need to be used. In addition, with the manufacturing method according to the present disclosure, it is possible to manufacture such film capacitors easily.

Although third resin layers 8 are formed in Embodiments 1 and 2, it is to be noted that third resin layers 8 are not always required.

In addition, each of bus bars 4a and 4b extends from a corresponding one of exposing ports 30 provided along the two opposing sides along the outer edges of metal laminate films 6. However, each of bus bars 4a and 4b may extend from exposing port 30 provided along one side of metal laminate film 6 and a corresponding side of another metal laminate film 6.

In Embodiment 3, folded parts 39 be preferably folded by 180 degrees at outer edge 32 of exposing port 30, as a non-limiting example case. The advantageous effect of reducing the possibility that a short circuit occurs between metal layers 6b of metal laminate films 6 and bus bar 4 is obtained when folded parts 39 are folded by at least 90 degrees or above.

In Embodiments 1 to 3, flat wound bodies obtained by stacking and winding a metalized film for one of polarities and a metalized film for the other polarity are used as film capacitor elements, as a non-limiting example case. It is also possible to use stacked film capacitor elements obtained by alternately stacking a plurality of layers of a metalized film for one of polarities and a metalized film for the other polarity, instead of winding the metalized films. Alternatively, a film capacitor may have a configuration in which a plurality of film capacitor elements connected to a bus bar in parallel to each other are covered by metal laminate films.

Although film capacitors and manufacturing methods therefor according to one or more aspects have been described based on the embodiments above, the present invention is not limited to these embodiments. Embodiments obtainable by adding various kinds of modifications conceivable by those skilled in the art to the above embodiments or embodiments obtainable by combining some constituent elements of different embodiments may be included in the scopes of the plurality of aspects as long as they do not depart from the principles and spirit of the present invention.

INDUSTRIAL APPLICABILITY

The present invention is useful in film capacitors which are used for HEVs, EVs, etc.

REFERENCE MARKS IN THE DRAWINGS

1 Film capacitor
2 Film capacitor element
4, 4a, 4b Bus bar
5 Exterior member
6 Metal laminate film
6a Inner resin layer (first resin layer)
6b Metal layer
6c Outer resin layer
7 Second resin layer
7a Resin sheet
8 Third resin layer
9 Fourth resin layer
29 Edge
30 Drawing port
32 Outer edge
36a, 36b End part
39 Folded part
71 Protrusion
100 Gap (opening)

The invention claimed is:

1. A film capacitor, comprising:
   a film capacitor element;
   a bus bar connected to the film capacitor element; and
   an exterior member which covers the film capacitor element and the bus bar,
   wherein the exterior member is formed of a metal laminate film, the metal laminate film having a first resin layer on a surface facing the film capacitor element,
   a part of the bus bar is exposed to an outside of the exterior member, and
   a second resin layer containing an acid-modified resin is formed between the first resin layer and the bus bar at an exposing port of the exterior member through which the part of the bus bar is exposed from the exterior member,
   the second resin layer has a protrusion which protrudes from the outer edge of the exposing port to the outside of the exterior member, and
   the film capacitor further comprising a third resin layer which covers the protrusion of the second resin layer.

2. The film capacitor according to claim 1, wherein the third resin layer contains a resin different from a resin utilized for the first resin layer and the second resin layer.

3. The film capacitor according to claim 2,
   wherein the resin of the third resin layer has a softening point of 220 degrees Celsius or above.

4. The film capacitor according to claim 1, wherein the exterior member has a folded part folded to expose the first resin layer at the outer edge of the exposing port.

5. The film capacitor according to claim 1, further comprising:
   a fourth resin layer between the bus bar and the second resin layer,
   wherein the second resin layer contains an acid-modified polypropylene, and
   the fourth resin layer contains an epoxy resin.

6. The film capacitor according to claim 1, wherein the bus bar has a thickness of not less than 0.6 mm and not greater than 2.0 mm.

7. The film capacitor according to claim 1, wherein the bus bar in the exposing port has chamfered portions.

8. A method for manufacturing a film capacitor in which a film capacitor element and a bus bar connected to the film capacitor element are covered by an exterior member formed of a metal laminate film having a first resin layer as one of surfaces, the method comprising:
- electrostatically coating the bus bar with acid-modified resin powder to form an acid-modified resin coated film;
- after the electrostatically coating, heating the acid-modified resin coated film so that the film is melted to form a baking-finish acid-modified resin coated film; and
- after the heating, covering the film capacitor element and the bus bar using the exterior member so that a part of the bus bar is exposed to an outside of the exterior member and the first resin layer of the exterior member faces the film capacitor element, and heating a resin sheet containing the baking-finish acid-modified resin disposed between the first resin layer and the bus bar in the exposing port of the exterior member through which the part of the bus bar is exposed to the outside of the exterior member so that the resin sheet is melted to form a second resin layer containing an acid-modified resin.

9. A film capacitor, comprising:
- a film capacitor element;
- a bus bar connected to the film capacitor element; and
- an exterior member which covers the film capacitor element and the bus bar,
- wherein the exterior member is formed of a metal laminate film, the metal laminate film having a first resin layer on a surface facing the film capacitor element,
- a part of the bus bar is exposed to an outside of the exterior member, and
- in an exposing port of the exterior member through which the part of the bus bar is exposed from the exterior member:
- a second resin layer containing an acid-modified resin is formed between the first resin layer and the bus bar; and
- a layer containing an epoxy resin is formed between the bus bar and the second resin layer.

10. The film capacitor according to claim 9, wherein the second resin layer contains an acid-modified polypropylene.

11. The film capacitor according to claim 9, wherein the bus bar contains copper or a copper alloy.

* * * * *